United States Patent [19]

Belknap

[11] 4,027,804

[45] June 7, 1977

[54] LAMP COMPONENT TRANSPORT DEVICE

[76] Inventor: Donald J. Belknap, P.O. Box 325, Mountain Home, N.C. 28758

[22] Filed: Aug. 8, 1975

[21] Appl. No.: 603,160

Related U.S. Application Data

[62] Division of Ser. No. 372,535, June 22, 1973, Pat. No. 3,914,640, which is a division of Ser. No. 147,747, May 28, 1971, Pat. No. 3,762,900.

[52] U.S. Cl. .............................. 214/1 BV; 214/1 Q

[51] Int. Cl.$^2$ .......................................... B65G 47/92

[58] Field of Search ............... 214/1 B, 1 BD, 1 BS, 214/1 BV; 198/19, 20 R, 339, 489, 690, 691

[56] References Cited

UNITED STATES PATENTS

| | | | |
|---|---|---|---|
| 3,200,965 | 8/1965 | Saunders et al. | 214/1 BD |
| 3,314,555 | 4/1967 | Baker et al. | 214/1 BD |

*Primary Examiner*—Trygve M. Blix
*Assistant Examiner*—Gregory W. O'Connor
*Attorney, Agent, or Firm*—Shapiro and Shapiro

[57] ABSTRACT

Axial-geometry incandescent lamps with accurately aligned, self-centering helical filaments are disclosed, the filaments having heavy end sections which are mechanically deformed to grip a helical center section. Tubular lamp envelopes have a glass center section and metal end sections heat-sealed thereto. Envelopes are produced in quantity by a machine having magazines loaded with envelope components, the components being automatically assembled and united by heat sealing. Envelopes of larger size may employ glass-beaded metal end sections formed before the end sections are assembled with the center section. Rotation of the envelope components during heat sealing ensures seal uniformity and concentricity.

6 Claims, 38 Drawing Figures

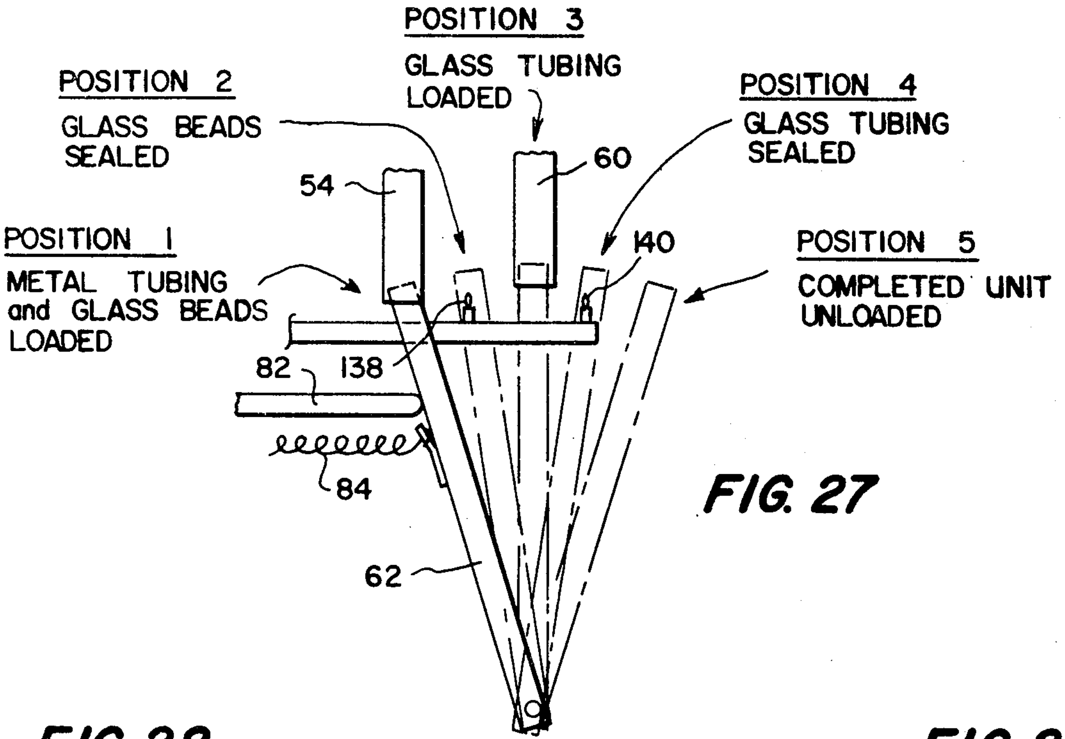
FIG. 27
FIG. 28
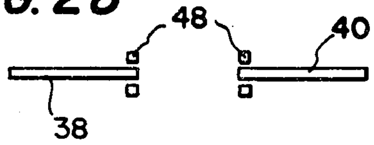
FIG. 29
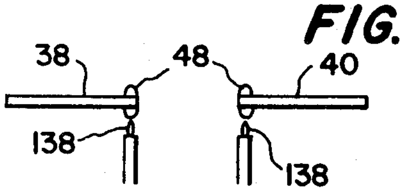
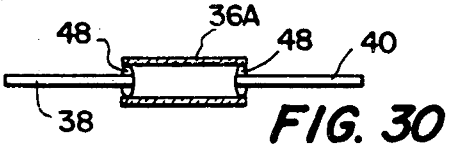
FIG. 30
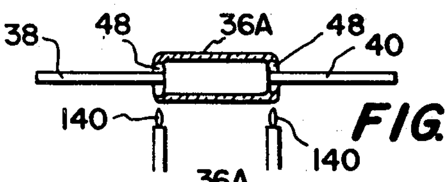
FIG. 31
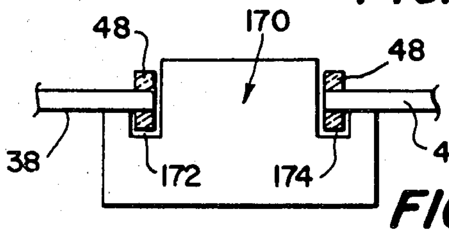
FIG. 33
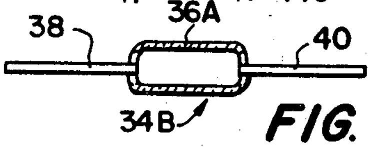
FIG. 32
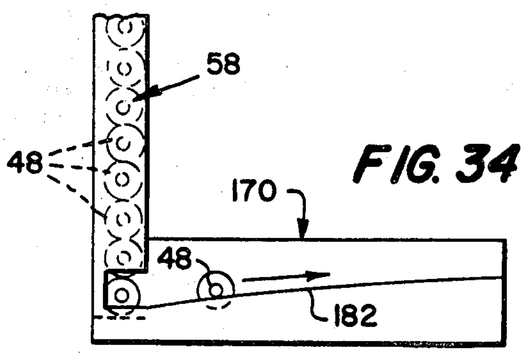
FIG. 34

LAMP COMPONENT TRANSPORT DEVICE

This is a divisional application of Ser. No. 372,535, filed June 22, 1973, now U.S. Pat. No. 3,914,640, granted Oct. 21, 1975, which is a division of Ser. No. 147,747, filed May 28, 1971, now U.S. Pat. No. 3,762,900, granted Oct. 2, 1973.

BACKGROUND OF THE INVENTION

This invention relates to incandescent lamps and to methods and apparatus for manufacturing the same. The invention is more particularly concerned with lamps of axial geometry, with the manufacture of filament units and lamp envelopes, and with the precise alignment of the filaments in the envelopes.

Lamps of microminiature size now being manufactured have an envelope comprising two pieces of metal tubing sealed into the ends of a central glass sleeve. The filament consists of a tungsten helix dragged into the envelope through the end pieces and positioned so as to be approximately centered with respect to the central glass sleeve and to have an end extending into each piece of metal tubing. The lamp is sealed by cold-weld pinch-offs through the pieces of metal tubing and the ends of filament helix extending therein. Such lamps are disclosed in the applicant's prior application Ser. No. 846,466, filed July 31, 1969, now U.S. Pat. No. 3,736,630, granted June 5, 1973. Such lamp construction and method of filament insertion have made possible the economical production of microminiature size lamps by eliminating costly hand labor on each lamp. However, because of variations in the very small end openings of the pieces of metal tubing after cutting and processing, neither the points where the ends of the helix contact the metal tubing nor the number of helix turns between the two pieces of tubing can be controlled precisely. This makes it necessary to select and group the lamps from even the same production run according to light output and electrical characteristics.

The applicant has previously disclosed apparatus and methods for making microminiature lamp envelopes of axial geometry in which the metal end pieces are inserted axially into the central glass sleeve from opposite ends and are then heat-sealed to the glass section. Such apparatus and methods are disclosed in the applicant's prior application, Ser. No. 760,852, filed Sept. 19, 1968, now U.S. Pat. No. 3,578,429, granted May 11, 1971. While these apparatus and methods perform admirably in the production of microminiature envelopes, it is difficult to obtain even heating of the joints for larger size envelopes and to maintain concentricity.

BRIEF DESCRIPTION OF THE PRESENT INVENTION

It is accordingly a principal object of the present invention to provide improved incandescent lamps, improved filament structures, and improved apparatus and methods for making incandescent lamps and the like.

A further object of the invention is to provide improved filament structures having accurately controllable light output and electrical characteristics and which are suited to axial-geometry lamps, not only in microminiature size but also in larger sizes as well.

A further object of the invention is to provide filament units which are self-centering in the lamp envelopes and which may be mass produced with different ratings for insertion in a common size envelope.

Another object of the invention is to provide filament structures employing continuously wound filament wire without straight wire sections, change in helix pitch, or special adaptations.

Still another object of the invention is to provide improved filaments manufactured and fixed within a lamp envelope by means of cold-weld pinch-offs alone, and without affecting the vacuum tightness of envelopes.

Another object of the invention is to provide improved apparatus and methods for manufacturing axial-geometry lamp envelopes, with improved glass-to-metal and glass-to-glass sealing and improved axial symmetry of the central glass section.

Another object of the invention is to provide improved apparatus and methods for manufacturing envelopes with glass-beaded metal end sections.

Still another object of the invention is to provide improved automatic operation in an envelope-making machine.

Briefly stated, axial-geometry incandescent lamps in accordance with the invention have a tubular envelope with a glass central section and metal end sections. The filament units comprise a length of helical wire joined at its ends to relatively massive terminal members which are mechanically deformed to grip the helical wire. The terminal members serve to align the filament with the axis of the envelope and are fixed to the tubular end pieces of the envelope by cold-weld pinch-offs through the end pieces. The envelopes are assembled seriatim from components dispensed from magazines. In one embodiment lengths of metal tubing which will constitute the end pieces are inserted through corresponding glass beads, which are then heat-sealed to the tubing. These assemblies are then inserted into opposite ends of a length of glass tubing, and the glass beads are heat-sealed to the glass tubing. During the heat sealing operations the components are rotated about their axis to ensure concentricity and uniform sealing.

BRIEF DESCRIPTION OF THE DRAWINGS

The invention will be further described in conjunction with the accompanying drawings, which illustrate preferred and exemplary embodiments, and wherein:

FIG. 27 is a diagrammatic view illustrating the positions of the transport during the manufacture of a lamp envelope;

FIGS. 28–32 are diagrammatic views illustrating the steps in the manufacture of an envelope;

FIG. 33 is a fragmentary end elevation view illustrating the manner in which glass beads are guided at the bottom of the bead magazine;

FIG. 34 is a fragmentary side elevation view illustrating the guiding of a glass bead at the bottom of the bead magazine;

DETAILED DESCRIPTION OF THE INVENTION

Figure 1:
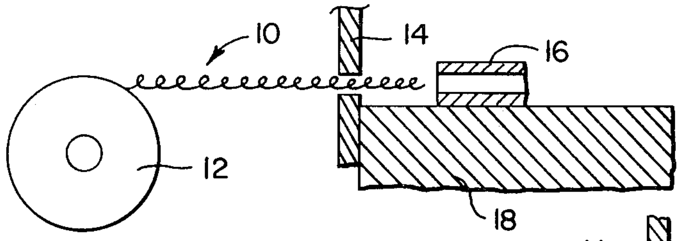
FIGS. 1–7 are fragmentary vertical sectional views illustrating the manufacture of filament units.
Figure 2:
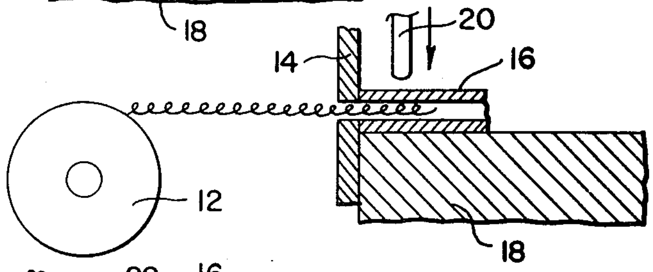
Figure 3:
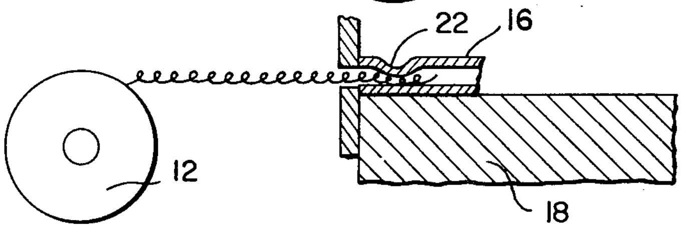
Figure 4:
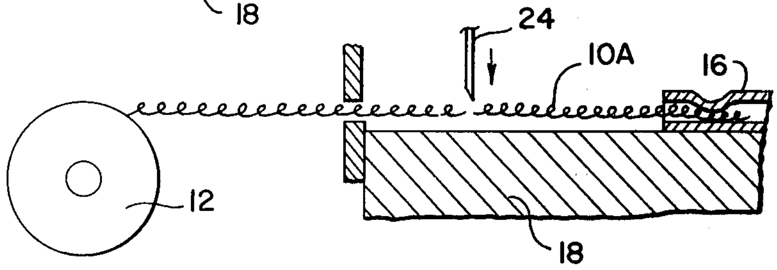

Referring to the drawings, and initially to FIGS. 1–6, filament units of the invention may be manufactured from helically coiled filament wire 10, such as tungsten wire of 0.00025 inch diameter wound upon a mandrel of 0.002 inch diameter. The helically coiled filament wire may be stored upon a spool 12 and drawn off as needed or it may be stored in individual lengths of helically coiled wire. In the form shown in FIG. 1 filament wire from the spool 12 is passed through an opening in a guide 14 toward the end of a length of metal tubing 16 supported upon a table 18. The tubing may be nickel metal tubing, 0.400 inch in length, 0.015 inch in O.D., and 0.005 inch in I.D. As shown in FIG. 2 the filament wire is inserted a short distance into the end of the metal tubing, and then the smoothly rounded end of an indenting tool 20 is brought downwardly into engagement with the tubing. The tool 20 deforms the tubing as shown at 22 in FIG. 3, several turns being compressed and gripped. The number of turns within the tubing is determined by the insertion. Next the tubing is moved to the right as shown in FIG. 4 to draw a length of filament wire from the spool, and then the wire is cut or burned as indicated by the cutting tool 24 in order to sever a length of wire 10A from the spool supply.

Figure 5:
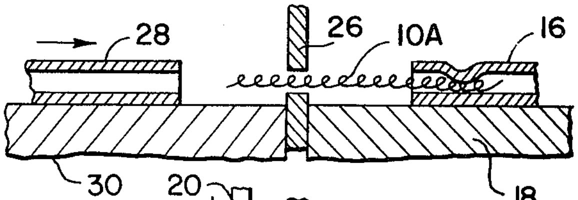
Figure 6:
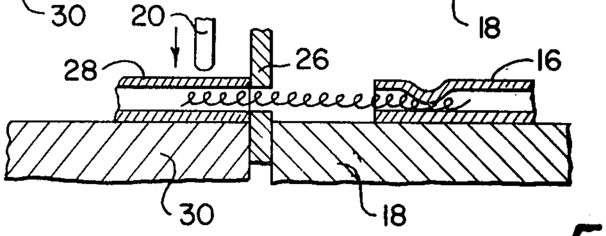
Figure 7:
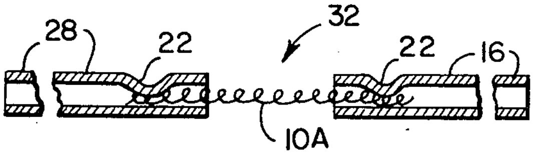

The unit comprising the length of wire 10A and the metal tubing 16 is then placed in the position shown in FIG. 5, with the filament wire protruding through an opening in a guide 26. A further length of metal tubing 28 supported upon a table 30 is moved to the right so as to insert the free end of the coiled wire 10A into the tubing 28. Next the rounded nose of the tool 20 is brought downwardly upon tubing 28 as shown in FIG. 6 to deform the tubing and cause it to grip the corresponding end of the wire 10A. The finished filament unit 32 is shown in FIG. 7.

Figure 8:
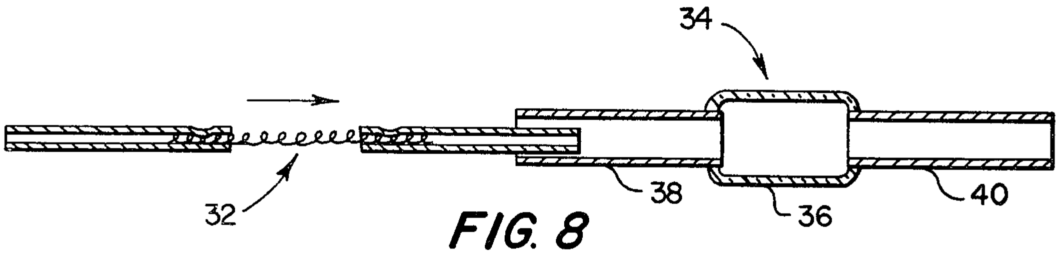
FIGS. 8–12 are vertical sectional views illustrating the insertion of the filament unit within an envelope and the completion of a lamp.

FIG. 8 illustrates the filament unit being inserted into an envelope 34 in accordance with the invention. The envelope comprises a central section 36, which may be a glass sleeve of uniform wall thickness, for example, and a pair of tubular end pieces 38 and 40 which are heat-sealed to the end of the glass section 36. The wall thickness of the glass section is quite small compared to the inner diameter of the glass section, and the length of the glass section substantially greater than its outer diameter. The filament unit 32 can be inserted into the envelope 34 horizontally or dropped in vertically. The filament unit may be slightly longer than the envelope to facilitate insertion, and a wire may be pinched into one end terminal to permit the filament unit to be pulled into the envelope. For vertical insertion the wire may be bent over like a hook to support the filament unit within the envelope temporarily, or one of the tubular terminals of the filament unit may be bent in this manner.

Figure 9:
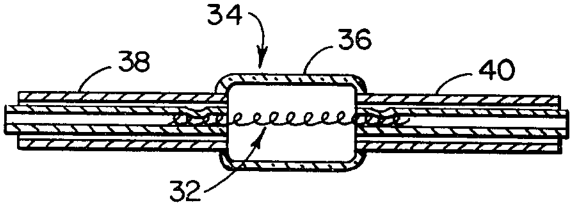
Figure 10:
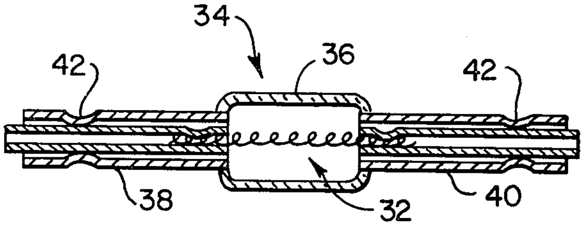
Figure 11:
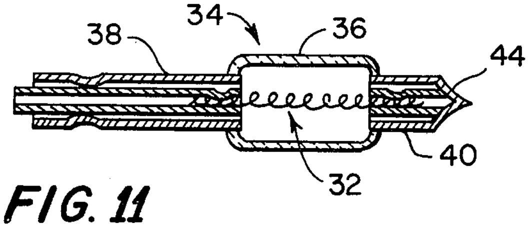
Figure 12:
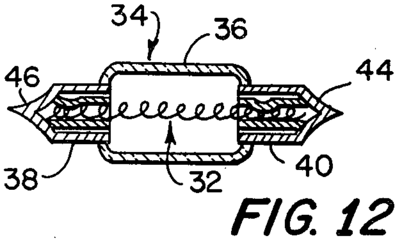
Figure 13:
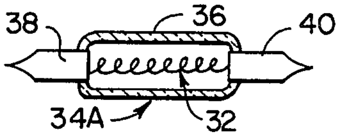
FIGS. 13–15 are vertical sectional views of modified forms of lamps.
Figure 14:
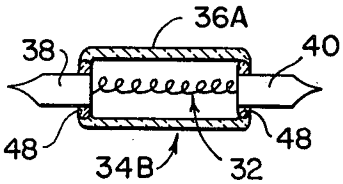
Figure 15:
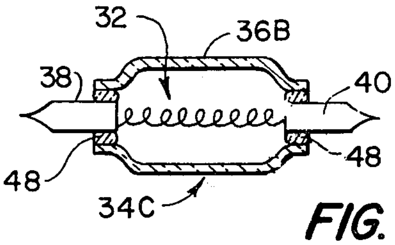

As shown in FIG. 9 the relatively massive end terminals of the filament unit serve to align the filament coil with the axis of the envelope when the filament coil is positioned symmetrically within the glass section. Indenting tools of the type described above then deform the end tubes of the envelope as shown at 42 in FIG. 10 to hold the filament unit in position within the envelope during the completion of the lamp. The lamp unit of FIG. 10 is baked in a vacuum, and then a cold-water pinch-off tool pinches off one of the end tubes of the envelope as shown in FIG. 11 at 44, severing the end tube and forming a vacuum-tight seal mechanically as described in greater detail in applicant's prior U.S. Pat. No. 3,505,556. The envelope may then be evacuated through the other end tube, and finally that end tube is pinched off in the same manner as shown at 46 in FIG. 12, thereby completing the lamp. FIGS. 13–15 illustrate three types of envelopes 34A, 34B, and 34C. In FIG. 13 the outer diameter of the metal end pieces is close to the inner diameter of the glass sleeve 36. In FIG. 14 the outer diameter of the metal end pieces 38 and 40 is considerably smaller than the inner diameter of the glass sleeve 36A, and glass beads 48 are sealed between the end pieces 38 and 40 and the glass sleeve 36A. In FIG. 15 there is a still greater disparity between the maximum diameter of the glass section and the metal end pieces, the glass section having ends of reduced diameter to engage the beaded metal tubing.

Figure 35:
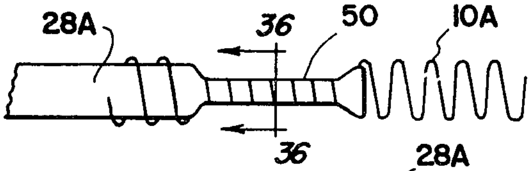
FIG. 35 is a fragmentary side elevation view illustrating one form of junction between a filament coil and an end terminal.
Figure 36:
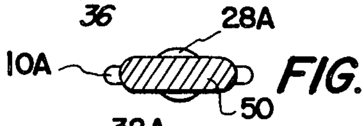
FIG. 36 is a sectional view taken along line 36—36 in FIG. 36.
Figure 37:
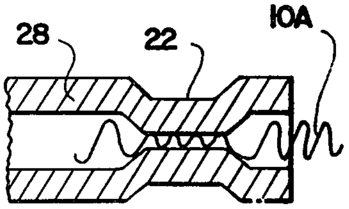
FIG. 37 is a fragmentary vertical sectional view illustrating another form of filament coil and end terminal junction.
Figure 38:
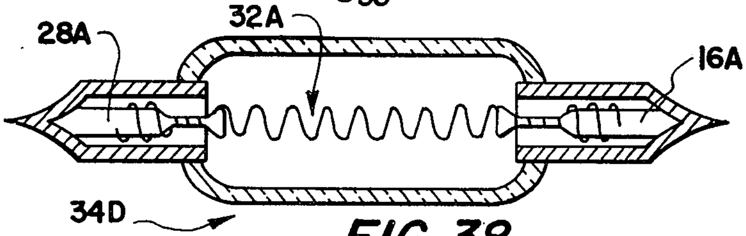
FIG. 38 is a longitudinal sectional view of a lamp having a filament unit of the type shown in FIG. 35.

FIG. 37 illustrates in greater detail the manner in which a metal terminal sleeve 28 may be deformed to grip the end of the helical filament wire 10A and provide excellent mechanical and electrical contact. In this instance opposite sides of the metal tubing are shown deformed symmetrically. FIGS. 35 and 36 illustrate cylindrical solid end terminals which are inserted into the ends of the helical coil and then flattened locally at 50 to embed the filament wire into the end terminal, the filament coil becoming flattened also at the end so as to protrude laterally from the end terminal as shown in FIG. 36. A finished lamp 34D employing a filament unit 32A with solid leads 28A and 16A is shown in FIG. 38.

Figure 16:
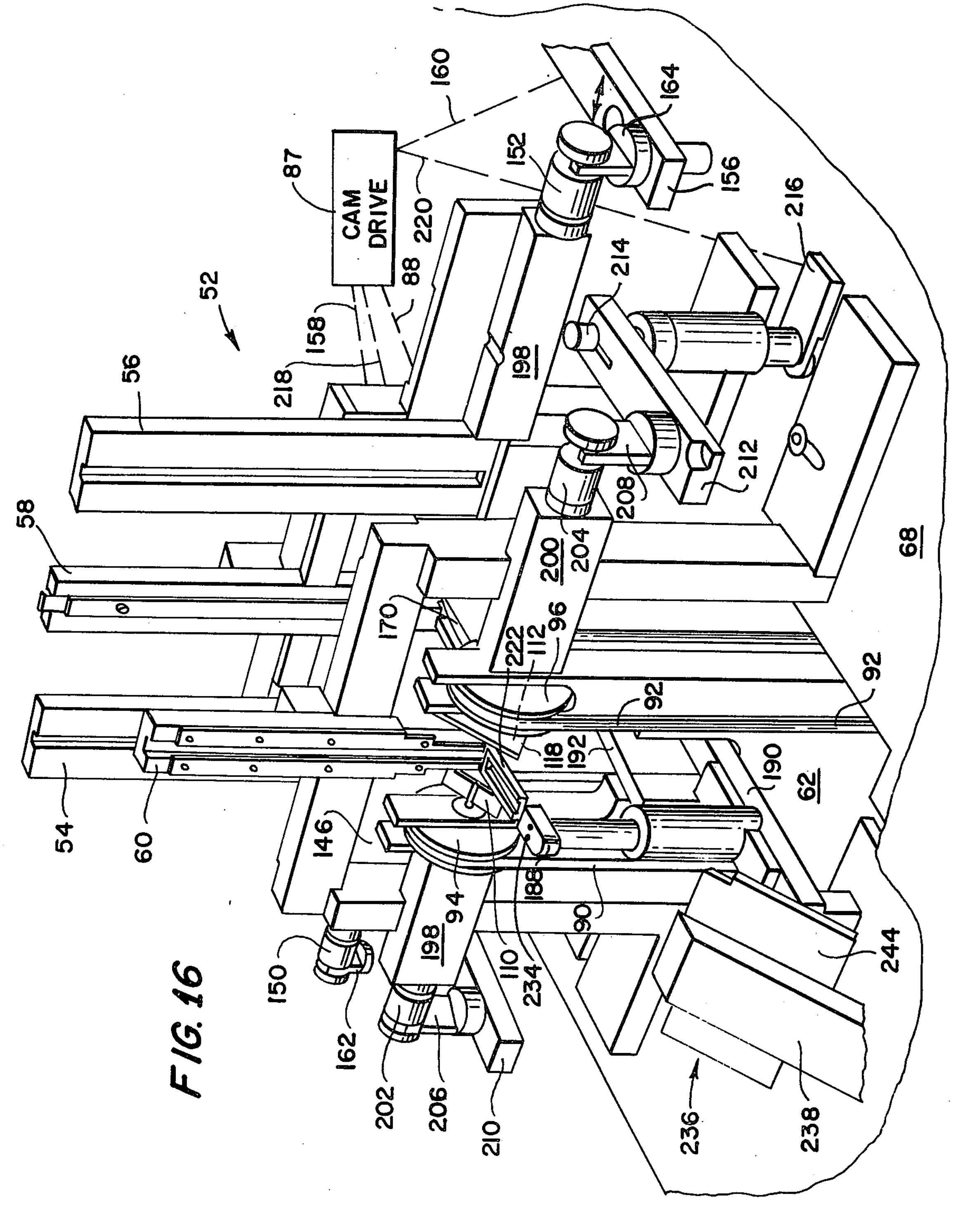
FIG. 16 is a perspective view of a machine for manufacturing lamp envelopes.
Figures 17, 18:
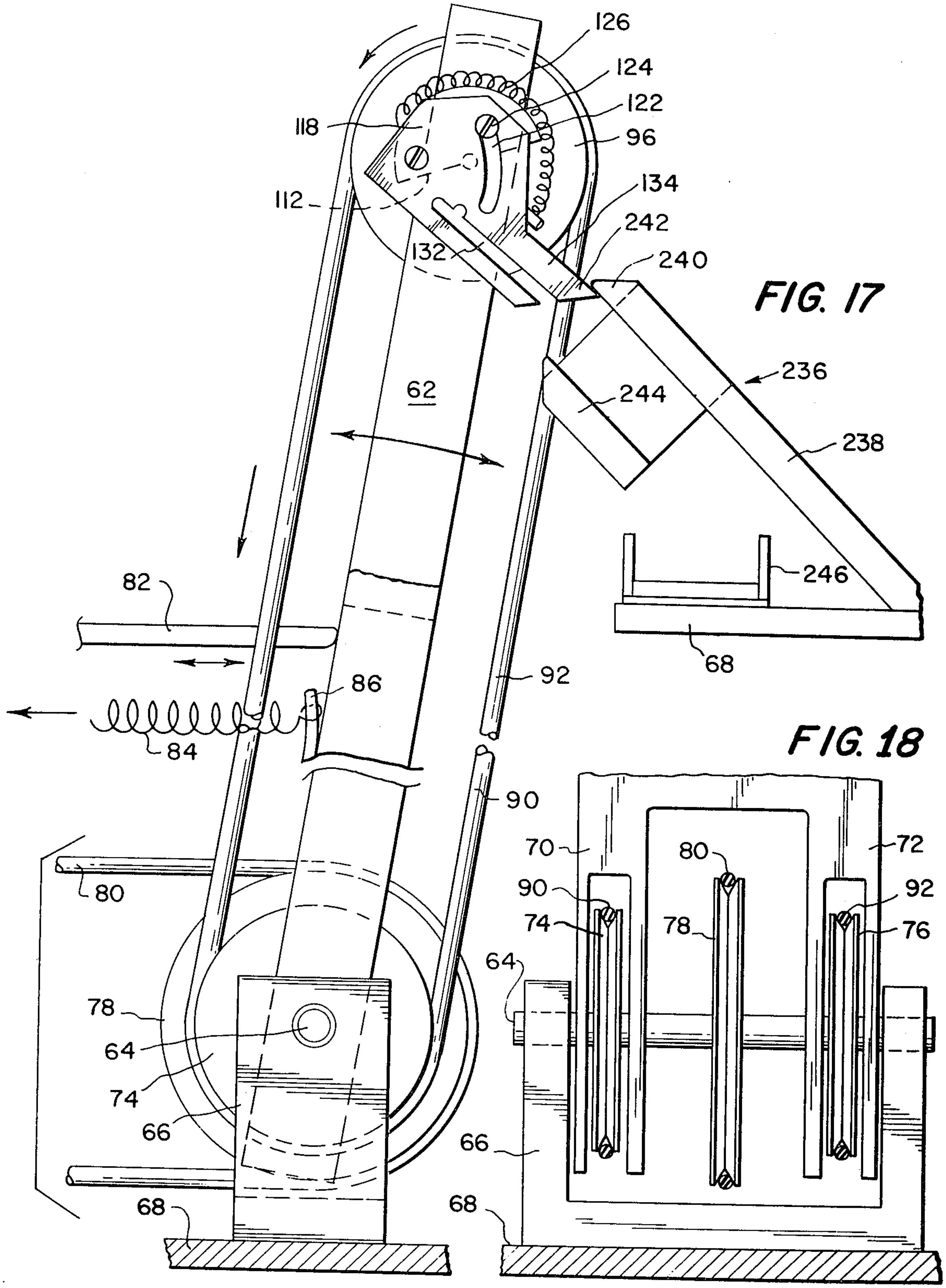
FIG. 17 is a side elevation view illustrating the manner in which finished envelopes are discharged from the transport of the machine of FIG. 16.
FIG. 18 is a fragmentary end elevation view of the lower portion of the transport illustrating the drive pulleys.

FIG. 16 illustrates a machine 52 for manufacturing envelopes in accordance with the invention. The components of the envelopes are stacked in magazines. In the form shown magazines 54 and 56 contain stacked metal tubing for the end sections of the envelopes: magazine 58 contains two stacks of glass beads; and magazine 60 contains a stack of glass sleeves for the central section of the envelope. The transport which carries the components of the envelopes through the successive manufacturing steps in shown at 62. It comprises an arm bifurcated at the top and bottom and pivotally supported at the bottom for movement in a vertical plane about a horizontal axis. The pivot pin is shown at 64 in FIG. 18 supported by a U-shaped bracket 66 upon the frame 68 of the machine. The lower bifurcations 70 and 72 of the transport arm are themselves bifurcated to embrace pulleys 74 and 76 fixed to the pin 64. A central pulley 78 is also fixed to the pivot pin and is driven by a belt 80 from an electric motor (not shown) as indicated in FIG. 17, thereby to drive both of pulleys 74 and 76. The pivot pin 64 is free to turn within journals upon the lower bifurcations 70 and 72, so that the rotation of the pivot pin does not affect the motion of the transport arm.

The transport arm is moved forwardly by a rod 82 and rearwardly by a spring 84 as indicated in FIG. 17. One end of the spring is attached to a tang 86 fixed to the rear surface of the transport, and the other end is fixed to the frame. The rear end of rod 82 is driven by a cam of a conventional cam drive 87 indicated in FIG. 16, dash line 88 designating the connection from the cam drive to rod 82, which is supported on the frame for forward and backward reciprocating movement. Such cam drives are conventional in the machinery arts, a typical drive being illustrated in the applicant's aforesaid application Ser. No. 846,466 (U.S. Pat. No. 3,736,630). As shown therein, the cam drive may comprise a horizontal shaft extending laterally at the rear of the machine and having a series of parallel cams fixed thereto, the shaft being driven by an electric motor (separate from the motor which drives the belt 80 of FIG. 17), and the cams being shaped and phased to move cam follower shafts at the proper times in accordance with predetermined patterns. As will be seen hereinafter, rod 82 and the associated cam causes the transport 62 to move incrementally from a rearward position to a forward position, the movement being interrupted at different stations for the purpose of operations to be described. Thereafter, the transport is retracted to the rearward position by the spring 84.

Pulleys 74 and 76 drive belts 90 and 92, which pass over and turn corresponding pulleys 94 and 96 at the top of the transport. (See FIGS. 16 and 17.) The upper support bifurcations 98 and 100 (see FIG. 22) are, like and lower bifurcations, again bifurcated to embrace the pulleys 94 and 96, which are fixed to hubs 102 and 104 journaled in the upper bifurcations. See FIGS. 19, 20 and 23. The hubs are provided with central bores 106 and 108 (for a purpose to be described) and carry eccentric platforms 110 and 112 at their inner ends.

Figure 19:
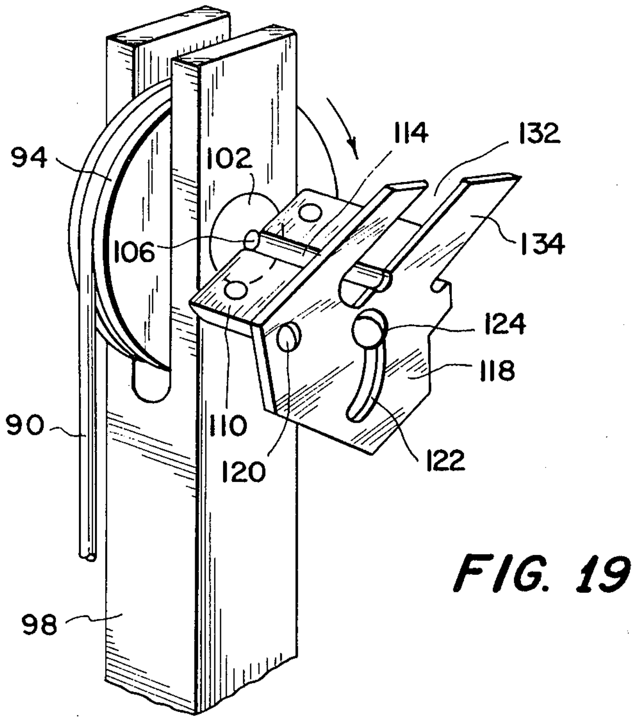
FIG. 19 is a fragmentary perspective view illustrating an envelope-supporting portion of the transport.
Figure 20:
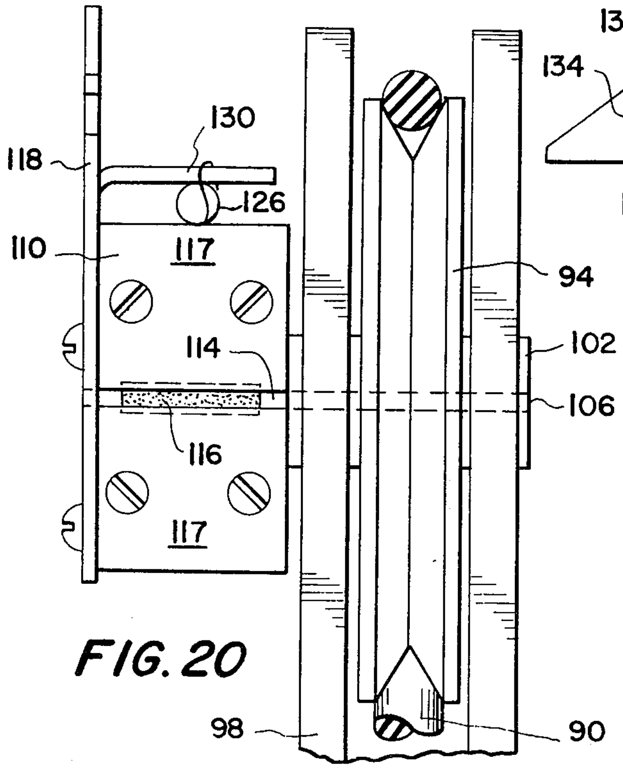
FIG. 20 is an fragmentary end elevation view of the apparatus of FIG. 19.
Figure 21:
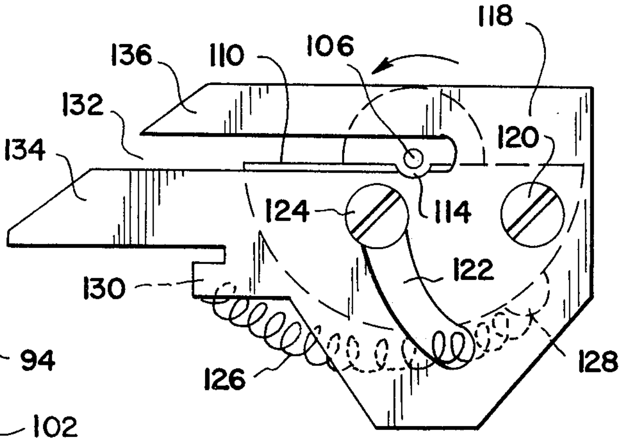
FIG. 21 is a side elevation view illustrating a portion of the apparatus of FIG. 19 in greater detail.

The cross-section of each platform is semicircular (see FIG. 21) and each platform has a longitudinal groove, such as the groove 114 shown in FIGS. 19–21, the groove constituting an extension of the corresponding hub bore. Set into the hub below the groove is a magnet 116, the groove being defined between a pair of plates 117 screwed to the surface of the platform.

As shown in FIGS. 19–21, the inner side of each platform is provided with a vertical plate 118 supported for pivotal movement by a pin 120. This movement is limited by a slot 122 in the plate through which a stud 124 extends from the platform. A spring 126 normally urges the plate 118 to the position illustrated in FIG. 21, one end of the spring being attached to a screw 128 fixed to the platform, and the other end of the spring being fixed to a horizontal tang 130 struck from the plate 118 as shown in FIG. 20. The spring 126 passes about the cylindrical surface of the platform. By this arrangement the plate is capable of being turned about the pivot pin 120 until the stud 124 engages the end of the slot 122 opposite to that with which it is shown engaged in FIG. 21, the spring 126 being stressed during this pivotal movement of the plate relative to the platform 110 and retracting the plate to the position shown in FIG. 21 when the plate is released. The plate is bifurcated to provide a slot 132 between a longer arm 134 and a shorter arm 136. The plate 118 normally rotates with the platform 110 until it is held from such movement as will be described later.

FIGS. 27–32 illustrate diagrammatically the operations performed for different positions of the transport 62. Details of the steps performed will be described hereinafter, but it is helpful to understanding of the manufacturing process of the invention to describe the steps broadly at this point. As shown in FIG. 27, at the rearward position of the transport 62, position 1, metal tubing and glass beads are loaded upon the transport. The tubing is shown at 38 and 40 in FIG. 28 and the beads at 48. At position 2 the glass beads are heat sealed to the metal tubing. This is indicated in FIG. 29, heat being supplied by the tiny flames 138. At position 3 glass tubing is loaded upon the transport and the beaded metal tubing is inserted into the ends of the glass tubing as shown in FIG. 30. At position 4 the glass tubing is heat sealed to the beads, as indicated in FIG. 31, heat being supplied by the tiny flames 140. Finally, at position 5 the completed envelope unit (shown in FIG. 32) is unloaded from the transport.

Figure 22:
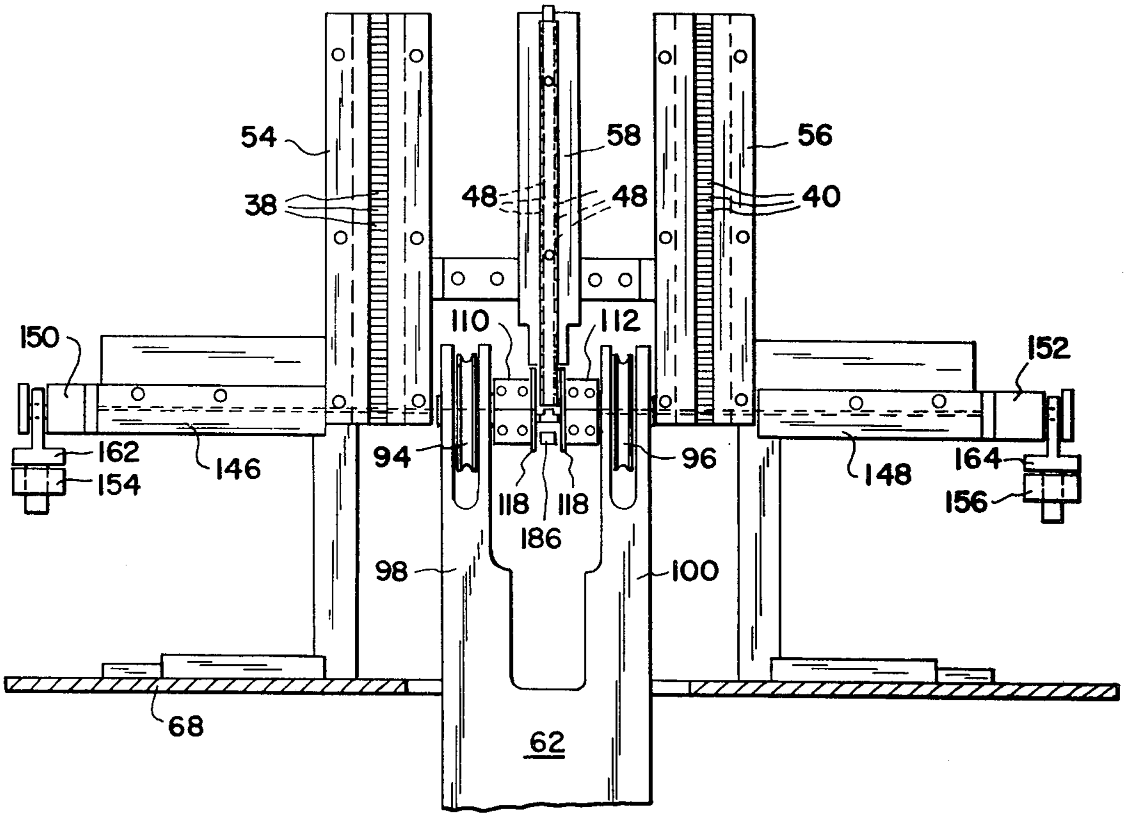
FIG. 22 is a fragmentary end elevation view illustrating the manner in which lengths of tubing are inserted into glass beads and placed upon the transport.
Figure 23:
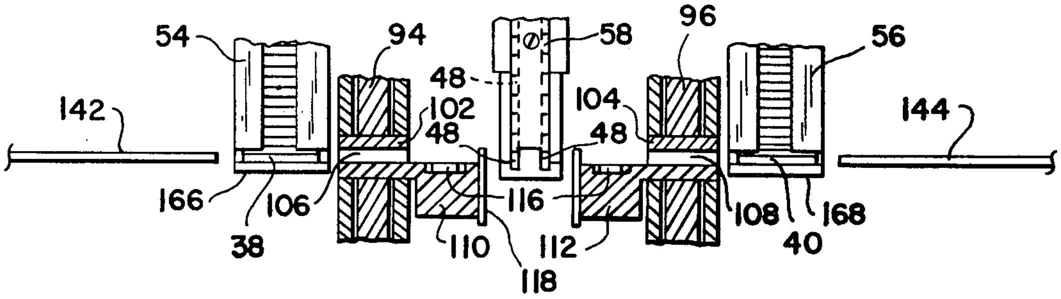
FIG. 23 is a vertical sectional view illustrating a portion of the apparatus of FIG. 22 in greater detail.

FIGS. 22 and 23 illustrate the operation at position 1. At this position the transport 62 is stationary, with the bores 106 and 108 aligned with push rods 142 and 144. The push rods reciprocate in the corresponding horizontal bores of blocks 146 and 148 supported upon the frame of the machine. The push pins extend from bases 150 and 152 which are moved toward and away from the outer end of the blocks 146 and 148, respectively, by rods 154 and 156. The rods are mounted horizontally on the machine frame for pivotal movement in a horizontal plane. The rods extend rearwardly, where they are pivotally mounted and driven from the cam drive 87 (FIG. 16) as indicated by the dash lines 158 and 160. The base portions 150 and 152 of the push pins are engaged by yokes 162 and 164 freely pivoted upon the corresponding rods for movement about a vertical axis. Thus, limited pivotal movement of the rods 154 and 156 is converted to reciprocative movement of the push pins 142 and 144.

FIG. 23 illustrates the push pins 142 and 144 in their retracted position, that is, with the base portions 150 and 152 remote from the blocks 146 and 148. In this position the push pins are ready to engage lengths of metal tubing loaded in the magazines 54 and 56. At the bottom of each magazine is a table 166 or 168 which supports the lowermost piece of metal tubing in the magazine. At the appropriate time the push pins 142 and 144 move toward each other and engage the lowermost piece of tubing in each of the magazines 54 and 56, pushing the tubing through the bores 106 and 108 of the transport and on to the grooves 114 of the transport platforms (see FIGS. 19–21) where they are held by the magnets 116. The width of the grooves 114 such is as to align the tubing precisely with corresponding glass beads at the bottom of the magazine 58.

Figure 25:
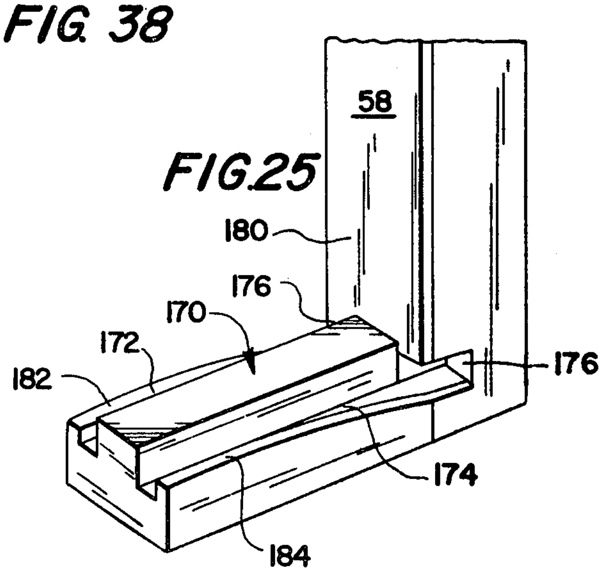

As shown in FIG. 25, the bottom of the magazine 58 is provided with a cantilevered guide block 170 and a pair of forwardly extending channels 172 and 174. Openings 176 and 178 are provided below the front plate 180 of the magazine to permit glass beads to enter the channels 172 and 174. The metal tubing is inserted into a glass bead at the entrance of the channels as shown in FIG. 33. Then, as the transport 62 moves forwardly from position 1 toward position 2 (FIG. 27), the glass beads are guided by the channels, the metal tubing moving along the curved upper edges 182 and 184 of the guide block 170, the curvature of these edges (see FIG. 34) accommodating the arcuate movement of the transport 62 indicated in FIG. 27. Before the transport can move from position 1 toward position 2, the push pins 142 and 144 must, of course, be withdrawn to the position illustrated in FIG. 23.

As noted previously, at position 2 (FIG. 27) tiny flames 138 are provided for heat sealing the glass beads to the metal tubing. These flames are provided by a burner 186 (FIG. 22) located centrally of the bifurcations 98 and 100 of the transport 62 so that the transport may pass by the burner. A similar burner 188 is show in greater detail in FIG. 16 and will be referred to hereinafter. Both burners are supported upon the longitudinally extending member 190 and are fed from a longitudinally extending gas pipe 192.

It is desired that the glass beads 48 be uniformly and concentrically sealed to the metal tubing 38 or 40. In order to accomplish this purpose the platforms are rotated during the heat-sealing operations so that the pieces of metal tubing turn about their axes. Such rotation is indicated in FIG. 19. The motor which drives belt 80 (FIG. 17) is started and stopped by a cam of the cam drive to effect rotational movement of the component platforms 110 and 112 at the heat-sealing positions and when the completed envelope units are to be unloaded from the transport.

Figure 24:
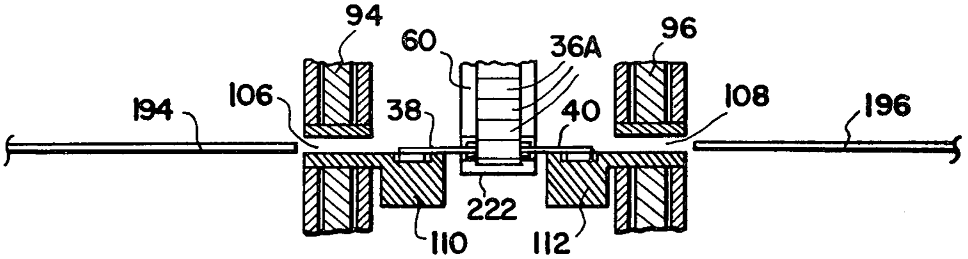
FIG. 24 is a vertical sectional view illustrating the apparatus for inserting beaded metal tubing into a glass sleeve.

The operation at position 3 (FIG. 27) is illustrated in FIG. 24. Here push pins 194 and 196 insert the beaded metal tubing into a glass sleeve. In FIG. 24 the beaded metal tubing 38 and 40 is shown supported upon the platforms 110 and 112 and the push pins 194 and 196 are shown retracted. At the appropriate time the push pins move toward each other, engage the ends of the metal tubing, and insert the metal tubing into a glass sleeve at the bottom of the magazine 60. The push pins 194 and 196 reciprocate in horizontal bores of blocks 198 and 200 (FIG. 16) supported upon the frame with the bores aligned with the bottom of the magazine 60. During insertion of the beaded metal tubing into the glass sleeve, the bores 106 and 108 of the transport are of course aligned with the bores of the blocks 198 and 200. Push pins 194 and 196 project from base portions 202 and 204 supported by members 206 and 208 upon rods 210 and 212 in the manner previously described with respect to the operation at position 1. The rear ends of rods 210 and 212 are fixed to vertical pins 214 (only one of which is shown in FIG. 16) journaled upon the frame. The lower ends of pins 214 are fixed to cranks 216 driven from the cam drive 87 as indicated by the dash lines 218 and 220.

Figure 26:
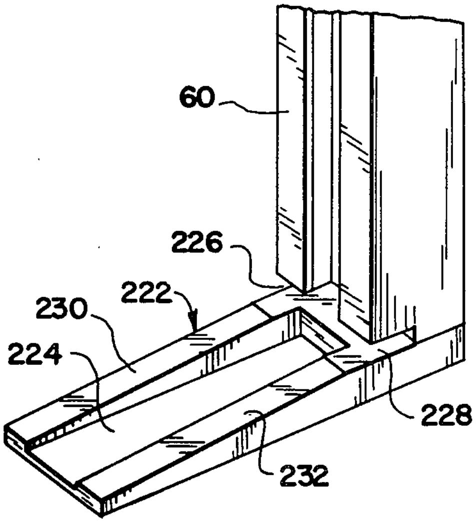
FIGS. 25 and 26 are fragmentary perspective views illustrating the lower portions of the bead magazine and the glass tubing magazine, respectively.

As shown in FIG. 26, the bottom of magazine 60 is provided with a guide block 222 having a central channel 224 for guiding the glass sleeves. Openings 226 and 228 are provided at the bottom of magazine 60 to permit the beaded metal tubing to be inserted into the ends of a glass sleeve at the bottom of the magazine. When the transport moves forwardly, the glass sleeve is guided by channel 224, and the metal tubing passes over the edges 230 and 232 of the guide block, the edges being contoured to accommodate the arcuate movement of the transport 62 between position 3 and position 4 (FIG. 27).

The heat-sealing of the glass tubing to the glass beads (position 4 of FIG. 27) illustrated in FIG. 31 is accomplished by means of the burner 188 (FIG. 16). The tiny flames 140 are located at the apertures 234 and are simply tiny gas flames. As noted above, during this heat-sealing operation the platforms 110 and 112 of the transport are rotated to ensure uniform and concentric seals. Although the platforms may be rotated continually during the manufacturing steps, it is preferred to interrupt the rotation to prevent the glass beads from "walking" upon the metal tubing prior to sealing thereto and to prevent similar walking of the glass sleeve prior to sealing to the glass beads.

Unloading of the complete envelope unit from the transport is accomplished at position 5 (FIG. 27). As shown in FIGS. 16 and 17, at this position an unloading mechanism 236 is mounted on the frame. The unloading mechanism comprises a plate 238 extending upwardly and rearwardly from the frame and having a tip 240 adapted to engage the tip 242 of the longer arm 134 of each plate 118. The platforms are kept rotating as the transport approaches the unloading mechanism, and when the tips 242 of the plates 118 engage the tip 240 of plate 238, the plates 118 are held against rotation while the platforms continue to rotate. The platforms turn until the studs 124 move to the opposite ends of slots 122, biasing the springs 126, and then the belts 90 and 92 and/or the belt 80 merely slip as the driving motor continues to rotate. The turning of the platforms 110 and 112 relative to the plates 118 causes the slots 132 to turn away from parallelism with the platforms and thus to pull the metal tubing of the finished envelope unit away from the holding magnets 116. The envelope unit thus freed from the magnets slides down the inclined slots 132 onto a ramp 244 suspended from plate 238 and drops from this ramp into a receptacle 246. Then the transport 62 is retracted by the spring 84, and when the tips 242 of the plates 118 clear the tip 240 of plate 238, springs 126 return plates 118 to their original position (FIG. 21) at which the slots 132 are parallel to the platforms. The transport returns to position 1 to begin the manufacture of the next envelope.

A typical lamp envelope in accordance with the invention may have a glass central section 7.5 mm long and 5 mm in diameter and 3 mil wall thickness. The metal end sections may have 0.045 inch O.D. and 0.028 inch I.D. and may project 2.5 mm out from the glass section. The spacing between the inner ends of the end sections may be 1.6 mm. The length of the exposed portion of the helical filament coil may be 1 mm and the outer diameter 0.25 mm, there being 16 turns. Typical tubing diameters for the metal end sections and corresponding filament lead diameters are as follows:

| | Filament Leads | Envelope Ends |
|---|---|---|
| Solid | .002 in.Nickel Wire | .015 in. O.D. × .005 in I.D. |
| Solid | .005 in.Nickel Wire | .022 in. O.D. × .010 in. I.D. |
| Tubular | .015 O.D. × .005 I.D. | .030 in. O.D. × .018 in. I.D. |
| Tubular | .022 O.D. × .010 I.D. | .045 in. O.D. × .028 in. I.D. |

-continued

| | Filament Leads | Envelope Ends |
|---|---|---|
| Tubular | .030 O.D. × .018 I.D. | .060 in O.D. × .040 in. I.D. |

It is apparent that the outer diameter of the filament leads is slightly less than the inner diameter of the envelope ends, thus ensuring self-centering when the envelope ends are symmetrically pinched onto the filament leads. The filament units are made without soldering, brazing, welding, skip-forming, or hooking, and without requiring special end terminals.

The envelopes of the invention are complete before insertion of the filament unit, except for the end pinch-offs, and the filament units are complete before insertion in the envelopes, thus facilitating automated manufacturing of the lamps. No brazing, soldering, welding, or heat-sealing is required to complete the lamps after the filament units are inserted, and in fact the only heating required utilizes tiny localized flames at one side of the components of the envelope, so that there is no melting and deformation beyond the regions to be sealed.

The invention thus provides incandescent lamps or the like of great precision, economically, and in a wide range of sizes.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A component transport comprising a platform for holding a component, means for moving said platform from one station to another, and means for unloading said component from said platform, the last-mentioned means including pivotal means supported on said platform for pivotal movement relative thereto and for engaging the component on said platform and moving it therefrom, said platform having a magnet for holding a component thereon magnetically, said component unloading means including means located along the path of movement of said platform for engaging said pivotal means and causing it to pivot relative to said platform.

2. The apparatus of claim 1, said pivotal means having spring means for biasing it to a rest position.

3. A component transport comprising a platform for holding a component, means for moving said platform from one station to another, and means for unloading said component from said platform, the last-mentioned means including pivotal means supported on said platform for pivotal movement relative thereto and for engaging the component on said platform and moving it therefrom, said pivotal means comprising a plate with a slot through which said component projects when supported on said platform, said platform having means for rotating the same upon said transport, said unloading means including means for holding said plate and permitting the platform to turn relative to the plate.

4. A component transport comprising a platform for holding a component, means for moving said platform from one station to another, and means for unloading said component from said platform, the last-mentioned means including means supported on said platform for pivotal movement relative thereto and for engaging the component on said platform and moving it therefrom, said transport comprising an arm supported for turning movement, said platform being supported upon a hub rotatable upon said arm.

5. The apparatus of claim 4, said hub having a bore therethrough by which said component may be placed upon said platform.

6. The apparatus of claim 4, said hub being supported adjacent to one end of said arm, said means for rotating said platform comprising a pulley fixed to said hub and coupled to another pulley adjacent to the opposite end of said arm.

* * * * *